United States Patent Office 3,468,963
Patented Sept. 23, 1969

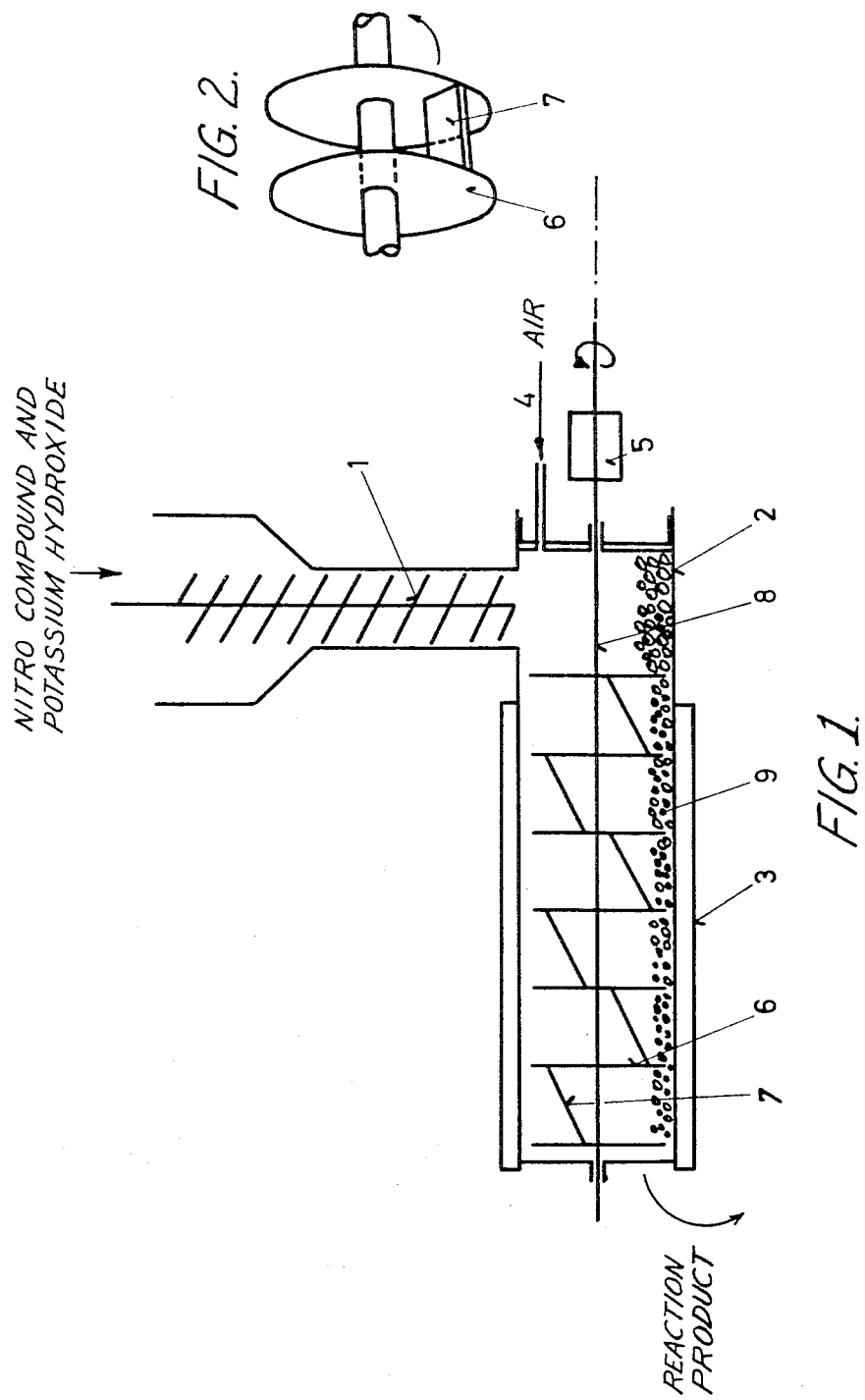

3,468,963
PROCESS FOR THE PRODUCTION OF NITROHYDROXYARYL COMPOUNDS
Peter Liechti, Binningen, and Willy Roth, Basel, Switzerland, assignors to Ciba Limited, Basel, Switzerland, a company of Switzerland
Filed June 16, 1966, Ser. No. 557,967
Claims priority, application Switzerland, June 30, 1965, 9,153/65
Int. Cl. C07c 37/00, 79/22
U.S. Cl. 260—620   2 Claims

ABSTRACT OF THE DISCLOSURE

A process is provided for the manufacture of nitrohydroxyaryl compounds wherein the corresponding nitroaryl compound is reacted with an alkali metal hydroxide in the solid state at a temperature above 70° C., while at the same time, molecular oxygen is injected into the reaction mixture.

---

It is known that nitroaryl compounds, such as nitrobenzene, meta-nitrotoluene and 1-nitropaphthalene, can be converted into nitrohydroxyaryl compounds by reaction with an alkali metal hydroxide. These reactions are invariably carried out by bringing solid alkali metal hydroxide into contact with a nitroaryl compound which is used in a substantially liquid form, either the compound as such being liquid at room temperature, or by carrying out the reaction at a temperature closely above the melting point of the pure nitroaryl compound, or by using additionally a solvent. This last-mentioned variant is preferably applied to nitroaryl compounds having a relatively high melting point, for example when reacting 4-nitrodiphenyl with potassium hydroxide, with the use of benzene as solvent.

Concerning the reaction sequence there are several opinions but one fact is generally accepted, namely that atmospheric oxygen or other molecular oxygen does not participate in the reaction. Whereas the time when the reaction was first performed there was as yet no explanation of the progress of the reaction available, a subsequent publication stated that in this reaction there are formed from 5 molecular proportions of nitrobenzene 2 molecular proportions of potassium nitrophenolate and 1 molecular proportion of the azoxybenzene, which can be represented as follows:

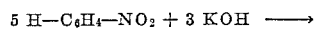

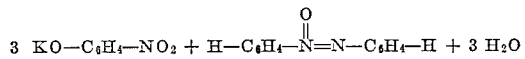

At any rate, in view of the known art (see German specification No. 116,790; Berichte, 32 [1899], p. 3486; Berichte 34 [1901], p. 2444; J. Am. Chem. Soc., 59 [1937], p. 1122) it had to be assumed that oxidation with atmospheric oxygen or other molecular oxygen is not possible and that the nitro compound used as starting material should be be reacted in some kind of liquid form with the alkali metal hydroxide. Furthermore in a reaction sequence as shown above, even when a theoretical yield is obtained, only 60% of the nitroaryl compound used can be transformed into a nitrohydroxyaryl compound, whereas the remainder is consumed as an oxidant.

It has now been found that a very surprising and valuable result is achieved when in the manufacture of nitrohydroxyaryl compounds by reacting a nitroaryl compound with an alkali metal hydroxide the reaction mixture is heated to a temperature at which it is still in the solid state, at any rate to at least 70° C., while at the same time injecting molecular oxygen into the batch. In this manner nitrohydroxyaryl compounds are obtained in a yield which, referred to the nitroaryl compound used, according to the simplest formulation corresponding to the equation (where R represents arylene):

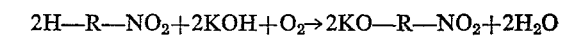

may amount to 90% or even more. The preferred variant of the present process is used for the manufacture of mononitro-ortho-hydroxyphenyl compounds and is characterized in that a mononitro-phenyl compound having a melting point above 70° C. is heated with powdered potassium hydroxide to a temperature ranging from 70° C. to below the sintering temperature, while stirring the mixture mechanically and at the same time injecting molecular oxygen into it.

Since the nitroaryl compound to be used in the present process must have a melting point above 70° C., the choice of starting materials suitable for its performance is limited. There are suitable, for example, 4-nitro-diphenyl-(1,1') compounds which may contain alkyl groups as further substituents. Among them, compounds of the formula

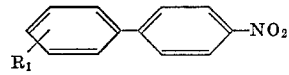

—where $R_1$ represents a hydrogen atom or an alkyl radical, for example an alkyl group containing 1 to 4 carbon atoms—are preferred. The alkali metal hydroxide used may be potassium hydroxide of which the commercial grades having the usual water content are generally well suited.

Since the reaction mixture is to remain free from liquid constituents during the whole of the reaction period, it is advantageous to mix the two solid starting materials in powder form, and this granular to pulverulent mixture is then mechanically stirred and heated and moved about at the requisite temperture until the reaction is complete. During the reaction molecular oxygen is injected into the mixture; it is advantageous simply to inject air into it. Depending on the reaction conditions chosen, that is to say the particle size of the materials used, supply of air or pure oxygen, temperature, mixing effect and the like, the reaction time may vary within wide limits (from, for example, 10 minutes when working continuously, to, for example, 20 hours in other cases).

It is very advantageous to carry out the reaction in a conventional paddle-type trough dryer. Alternatively, it may be carried out in other heatable machines used for grinding and/or mixing. It has proved particularly advantageous to work continuously with the use of reactors for solids operating on the principle of continuously working ball mills. Such an installation is illustrated in the schematic FIGURES 1 and 2, where 1 is a dosing screw for the two components
2 is a reactor rotor
3 is a heating jacket
4 is the air inlet
5 is the drive for the agitator
6 is one of the agitator plates
7 is a web between plates
8 is the agitator spindle and
9 are grinding balls.

In this installation the agitator webs between plates are inclined so that the solid materials are transported in the direction of the axis of the agitator.

The solid materials pass through the slot between the plates and the reactor tube.

It is advantageous to install the reactor in a manner such that the agitator axis (=longitudinal axis of the reactor) is slightly inclined; in this manner variability of the time of residence is achieved.

The reaction mixture may be worked up in the usual manner by taking it up in water—in which, as is known, the alkali metal compounds of nitroaryl compounds containing hydroxyl groups are readily soluble—whereupon the solution is filtered off the residual solids and the free hydroxyl compounds are then precipitated by adding an acid.

EXAMPLE 1

59.8 grams of 4-nitrodiphenyl and 150 g. of powdered potassium hydroxide containing about 10% of water are ground and mixed in a trough dryer equipped with paddles of 1 litre capacity for 20 hours at 25° C. The dryer is then heated to 80° C. and the mixture is allowed to react in a current of air (5 litres per hour) for 13 hours at 80° to 85° C., then cooled to room temperature, the resulting brilliantly red powder is dissolved in about 2 litres of hot water, a small amount of undissolved matter is filtered off, and the orange-red solution is neutralized with hydrochloric acid. After cooling, suctioning, washing with water and drying, there are obtained 58.4 g. (=90.4% of the theoretical amount) of 3-hydroxy-4-nitrodiphenyl in the form of brownish yellow crystals melting at 101° to 103° C. (The melting point mentioned in the literature is 103.1° to 103.2° C.)

If 4-nitrodiphenyl is replaced by an equivalent amount of 4'-methyl-4-nitrodiphenyl or 2'-methyl-4-nitrodiphenyl or 4'-tertiary butyl-4-nitrodiphenyl, there are obtained, respectively, in a similar yield and purity, 4'-methyl-3-hydroxy-4-nitrodiphenyl (melting at 110° to 111° C.), 2'-methyl-3-hydroxy-4-nitrodiphenyl (melting at 58° to 59° C.) and 4'-tertiary butyl-3-hydroxy-4-nitrodiphenyl (melting at 90° to 91° C.).

By using instead of the paddle-type trough dryer another heatable grinding apparatus, for example a 2-litre glass flask containing 1.8 kg. of glass beads of 3 mm. diameter and equipped with an agitator, equally good results are achieved, whereas by simple heating without accompanying grinding, for example in a drying cabinet, the rate of conversion reaches only about 50%.

EXAMPLE 2

In an exemplary continuous performance of the process a solids reactor designed on the principle of continuously working ball mills, as shown in the illustration, is used.

A mixture of 4-nitrodiphenyl and powdered potassium hydroxide (containing about 10% of water) at the ratio by weight 2:5 is reacted in the reactor (diameter 85.5 mm., length 500 mm.) under the following conditions:

Dosing rate _____ 10 g. per minute.
Air speed _____ 16 litres per minute.
Temperature of heating jacket _____ 85° C.
Rotary speed of agitator ___ 60 revolutions per minute.
Mean time of residence ____ 7 minutes (adjusted by inclining the reactor at an angle of 5°).

After 3 passages, that is to say after a total time of residence of 21 minutes, the batch is worked up as described in Example 1. There are obtained 3% of unreacted 4-nitrodiphenyl melting at 113° to 115° C. and—referred to the reacted 4-nitrodiphenyl—in a yield of 85% 3-hydroxy-4-nitrodiphenyl, melting at 101° to 103° C.

What is claimed is:
1. The process for the manufacture of a nitrohydroxyaryl compound by reacting a nitroaryl compound with an alkali metal hydroxide, which comprises heating a mononitrophenyl compound of the formula

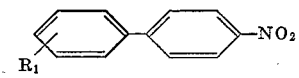

wherein $R_1$ represents a member selected from the group consisting of a hydrogen atom or an alkyl radical having 1–4 carbon atoms with powdered potassium hydroxide, with mechanical mixing and while injecting molecular oxygen into the mixture, to a temperature from 70° C. to below the sintering temperature, adding the solid reaction product to water, neutralizing the resulting solution and recovering the final precipitated nitrohydroxyaryl compound.

2. The process according to claim 1 for the manufacture of a nitrohydroxyaryl compound by reacting a nitroaryl compound with an alkali metal hydroxide, which comprises heating in a continuously operating solids reactor the mononitro compound of the formula

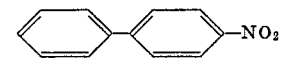

with powdered potassium hydroxide, with mechanical mixing and while injecting molecular oxygen into the mixture, to a temperature from 70° C. to below the sintering temperature, adding the solid reaction product to water, neutralizing the resulting solution and recovering the final precipitated nitrohydroxyaryl compound.

References Cited

Colbert et al.: Jour. Amer. Chem. Soc., 59, pp. 1122–4 (1937).
Wohl: Berichte, 32, pp. 3486–88 (1899).

LEON ZITVER, Primary Examiner
NORMAN P. MORGENSTERN, Assistant Examiner

U.S. Cl. X.R.
260—622